Feb. 11, 1941.    G. D. ALEXANDER    2,230,988
DUMP WAGON
Filed Sept. 30, 1939    3 Sheets-Sheet 1
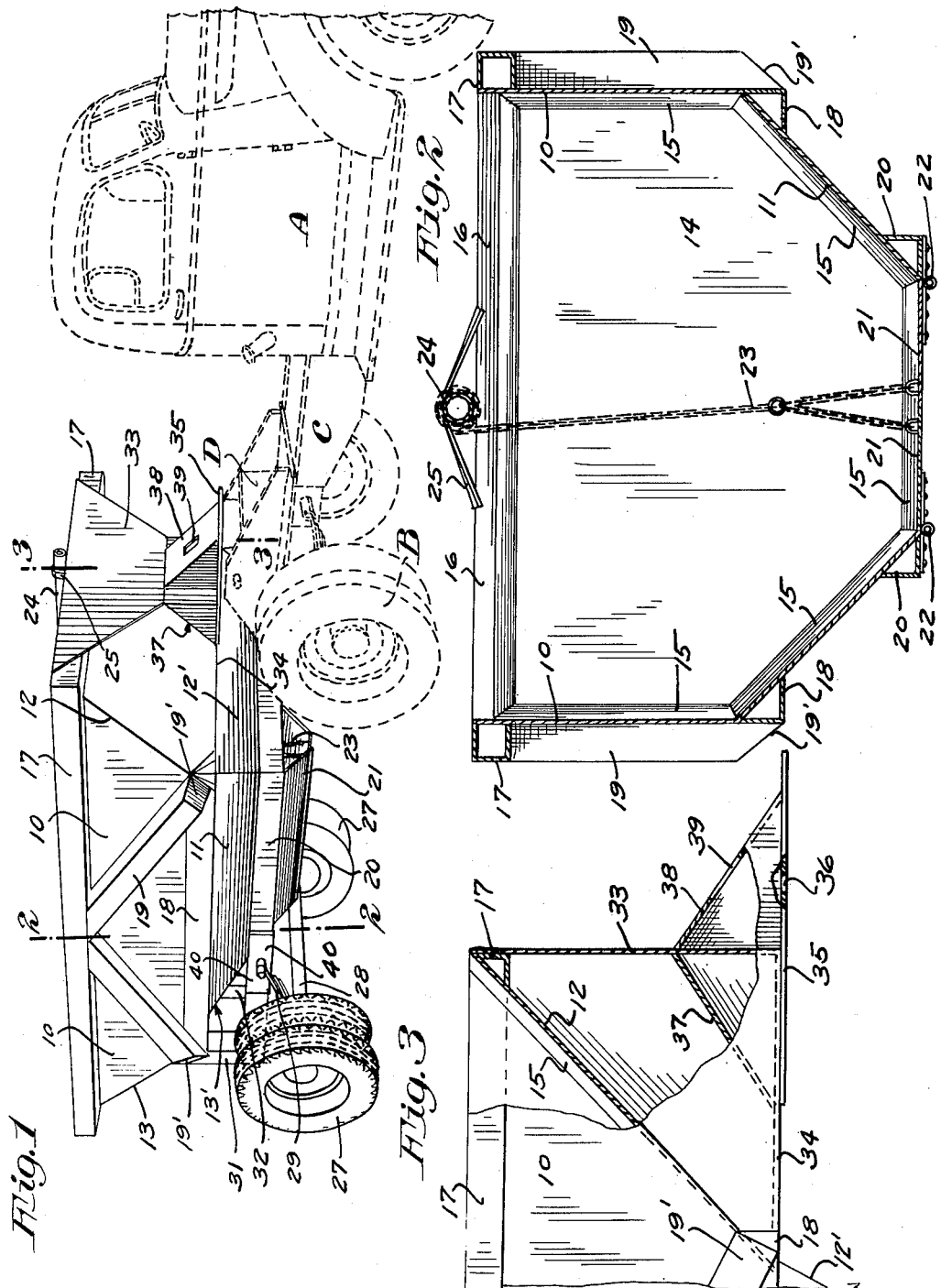
Inventor
George D. Alexander
By his Attorneys
Merchant & Merchant Feb. 11, 1941.  G. D. ALEXANDER  2,230,988
DUMP WAGON
Filed Sept. 30, 1939  3 Sheets-Sheet 2
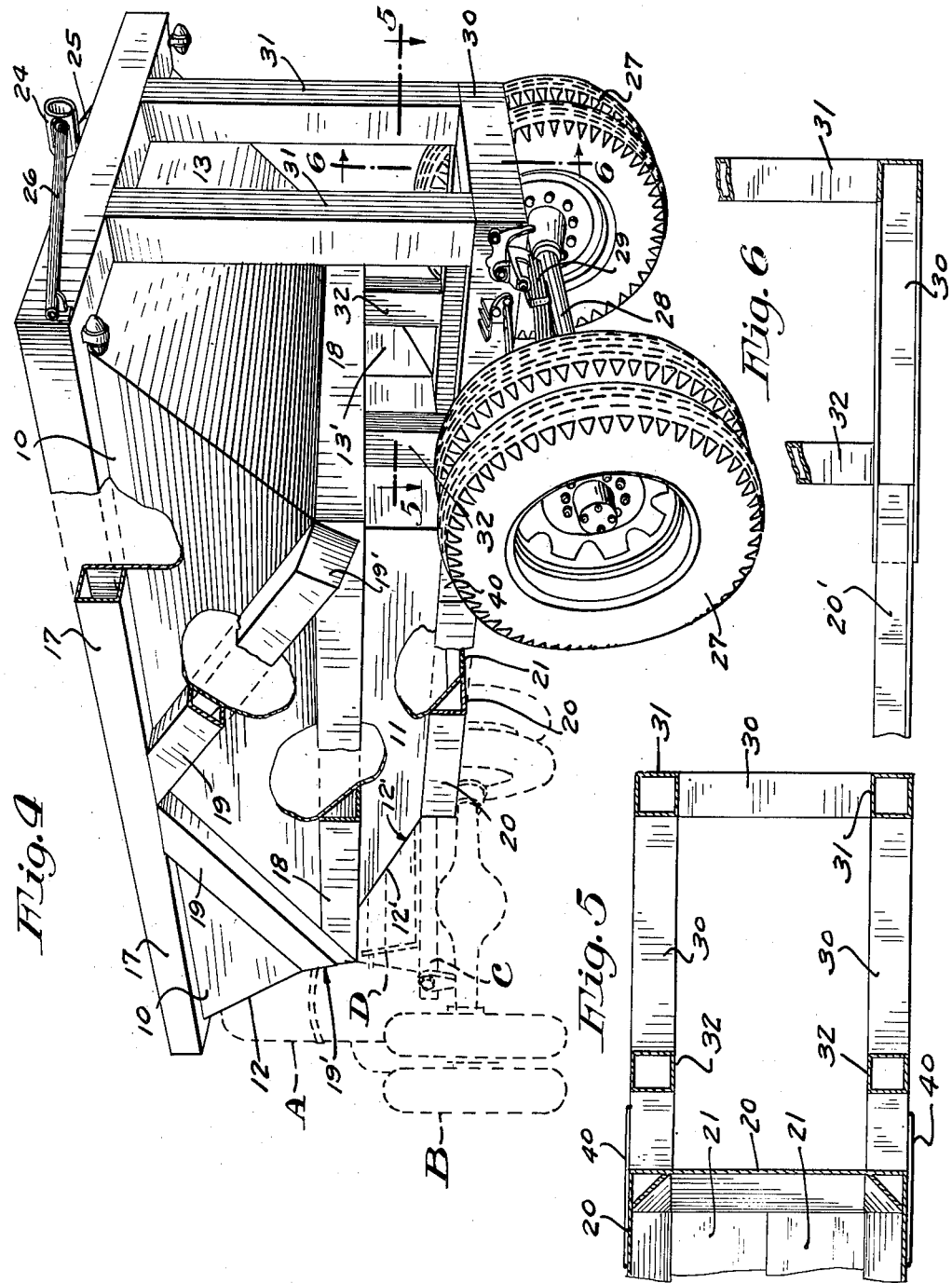
Inventor
George D. Alexander
By his Attorneys Feb. 11, 1941.　　G. D. ALEXANDER　　2,230,988
DUMP WAGON
Filed Sept. 30, 1939　　3 Sheets-Sheet 3
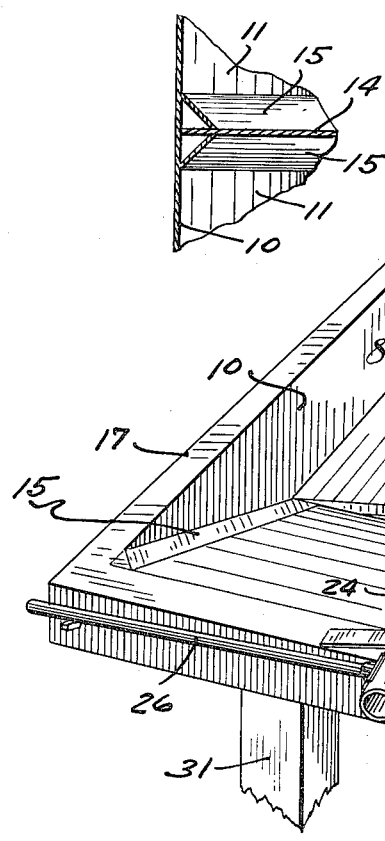
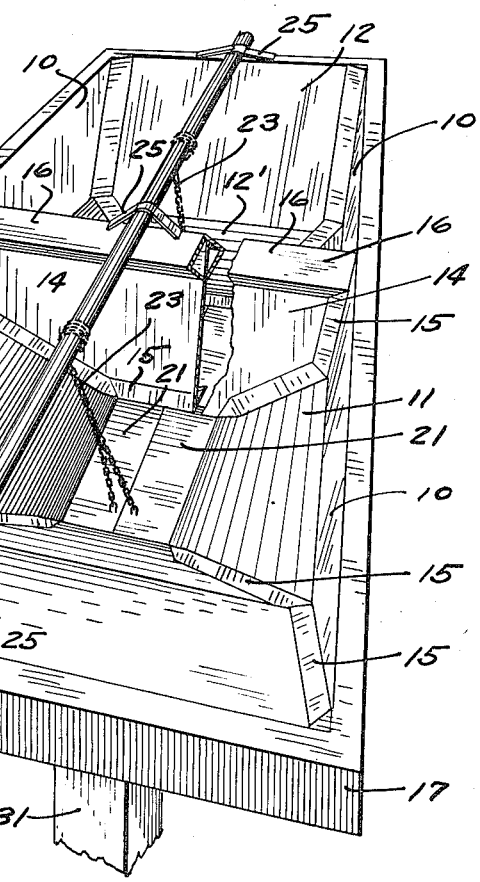
Inventor
George D. Alexander
By his Attorneys

UNITED STATES PATENT OFFICE 2,230,988

DUMP WAGON

George D. Alexander, Minneapolis, Minn.

Application September 30, 1939, Serial No. 297,270

6 Claims. (Cl. 298—35)

My invention provides an improved dump wagon body which is so constructed and designed that it may be made comparatively light but very strong and durable from commercial sheet metals, angles, channels and the like.

Generally stated the invention consists of the novel devices, combination of devices and arrangement of parts hereinafter described and defined in the claims.

Dump wagons, as is well known, are very generally used for transporting and dumping sand, gravel, iron ore, coal and the like. This improved wagon is especially designed for use as a trailer that may be readily attached or disconnected from a power truck.

A commercial form of the improved dump wagon body is illustrated in the accompanying drawings wherein like characters indicate like parts throughout the several views.

Referring to the drawings:

Fig. 1 is a perspective showing the improved body in full lines and showing by full lines the rear trailer wheels and by dotted lines the rear wheels or body of the power truck;

Fig. 2 is an enlarged transverse section taken on the line 2—2 of Fig. 1;

Fig. 3 is a fragmentary front to rear section taken on the line 3—3 of Fig. 1, some parts being shown in full elevation;

Fig. 4 is a perspective of the parts shown in Fig. 1 but with some parts broken away and with the parts viewed from the rear of the truck body;

Fig. 5 is a fragmentary horizontal section taken on the line 5—5 of Fig. 4;

Fig. 6 is a fragmentary vertical section taken from the rear toward the front on the line 6—6 of Fig. 4;

Fig. 7 is a perspective with some parts broken away looking downward at the body; and Fig. 8 is a fragmentary horizontal section taken on the line 8—8 of Fig. 7.

As indicated, the body has the general form of a hopper, rectangular in plan view, and is made of sheet metal reinforced by metal angle bars and channels. The sides of the body are made up of laterally spaced parallel rolled metal sheets 10 and downwardly converging hopper bottom plates 11.

The front end of the body is formed by an inclined sheet metal hopper plate 12 and the rear end is formed by a similar sheet metal plate 13. This hopper-like body, as shown, is divided into two compartments by a transverse sheet metal partition 14, the edges of which are welded to the side plates 10 and hopper plates 11. All of the angles formed between the said parts are preferably filled in by sheet metal fillet strips 15, the edges of which are also welded to the contacting plates. The upper edge of the partition 14 is reinforced by commercial angle strips 16 applied on opposite sides and welded thereto at contacting edges.

The rectangular top of the body is reinforced by metal channels 17 that are in an endless rectangular arrangement completely surrounding the upper edge of the sheet metal body and securely welded thereto so as to form a very strong yet relatively light reinforcement to the upper edge of the body.

At approximately the elevation of the junction between the plates 10 and 11, the entire body is further reinforced by metallic angle bars 18 applied to the exterior of the body with their edges welded to the plates 10, 11, 12 and 13. This channel 18 forms a rectangular endless reinforcement to the lower portion of the hopper-like body.

The sides of the hopper-like body are further reinforced by oblique metallic channels 19 that are extended in downwardly diverging arrangement from the intermediate portion of the sides of the channels 17 downward to the ends of the side portions of the channels 18. The channels 19 at their contacting edges and ends are welded to the side plates 10 and channels 17 and 18. Preferably the lower ends of the truss-forming channels 19 are closed by plates 19'.

The oblique hopper plates 11 extend to a plane far below the reinforcing angles 18, and the end plates 12 and 13 are extended respectively at 12' and 13' downward to the same level where they are reinforced by lower metal angles 20. These angles 20 extend completely around the bottom of the hopper-like body and their contacting edges are welded to the lower edges of the angle plates 11 and to 12' and 13' thereby forming, for the two compartments of the body, discharge openings. These discharge openings are normally closed by a pair of drop gates 21 preferably in the form of flat metal plates that are hinged at 22 to the lower edges of the hopper plates 11 and to the adjacent side members of the reinforcing angles 20.

As means for closing and opening the gates 21, I have shown chains 23 attached to the free edge portions of said gates, at their lower ends, and at their upper ends attached to a windless shaft 24 mounted in suitable bearings 25 on the channel 17 and on the angles 16.

The rock shaft 24 is shown as provided with an operating lever 26. However, any suitable means may be employed for operating the gates.

As stated, this device is in the nature of a trailer wagon or truck and hence it will be provided with rear supporting wheels. These wheels 27 are on axle 28 that will be connected to the rear portion of the body preferably through springs 29 or other well known means. However, these rear wheels should be applied to the dump body considerably at the rear of the contracted portion of the vehicle body, and hence for this purpose the body is provided with a rearwardly extended chassis frame of novel construction and arrangement, preferably made up as follows: The reinforcing body angles 20 at their rear ends are provided with extended angle bars 20' welded or otherwise rigidly secured thereto. These extension bars 20' are telescoped into metal channel bars 30 and are preferably welded thereto. The rear ends of the channel bars 30 are welded to vertically extended metal posts 31, the upper ends of which are welded to the transverse rear portions of the upper reinforcing channel 17. These posts 31 are preferably made by putting together two angle bars and welding together their contacting edges. Similar short posts 32 are welded to and extended between the front ends of the channels 30 and the transverse rear portion of the reinforcing angle 18.

At its front end the dump body is provided with means for pivotally coupling the same to the rear of the frame of the power truck.

In Figs. 1 and 4 the power truck, indicated as an entirety by the character A, is shown as provided with rear wheels B and the rear and frame extension is shown by C, on which latter is a customary or any suitable coupler bracket D.

To reinforce the front end of the dump body and to provide means for coupling the same to the power truck, said body at its front end is formed as follows: Numeral 33 indicates a metal coupling plate that is welded to and depends from the front portion of reinforcing channels 17 and at its lower edge is rigidly connected to the lower portion of the hopper body by a tie plate 34. Rigidly secured to the plate 34 and projecting forward thereof is a coupling plate 35 that is provided with a king pin passage 36. The coupling plate 35 is further reinforced and connected to the plates 33 and 34 by oblique box-like reinforcing structures 37 and 38. Plate 38 is provided with a large passage 39 through which the king pin, not shown, is adapted to be applied to couple the wagon or truck to the vehicle.

The lap joints between the extension bars 20' and the channel bars 30 are lapped and covered by joint plates 40 welded to the said elements.

In the preferred structure illustrated, the reinforcing elements 17, 18, 19, and 20 constitute channel shape or tubular reinforcing elements. The posts 31 and 32 and the base forming bars 30 are hollow or channel shaped. All of these elements just noted, even when made of comparatively light sheet metal or the like, will be very strong and at the same time relatively light.

What I claim is:

1. A wagon box of the kind described comprising side plates and end plates assembled in hopper-like form, a marginal rib reinforcing the upper edge of said box, an intermediate reinforcing rib on said box below said upper edge reinforcing rib, oblique reinforcing ribs extended from said upper edge rib to said intermediate rib, said hopper having in its bottom a discharge opening and a drop gate for closing and opening the same, a coupling plate secured to the front end of the lower portion of said hopper-like body, a vertical tie plate rigidly secured to said coupling plate and extending upward and rigidly secured to the front portion of said upper reinforcing rib, said coupling plate being projected forward of said vertical tie plate and constructed and adapted for coupling to the draft bar or bracket of a power truck.

2. A wagon box of the kind described comprising side plates and end plates assembled in hopper-like form, a marginal rib reinforcing the upper edge of said box, an intermediate reinforcing rib on said box below said upper edge reinforcing rib, oblique reinforcing ribs extended from said upper edge rib to said intermediate rib, said hopper having in its bottom a discharge opening and a drop gate for closing and opening the same, a coupling plate secured to the front end of the lower portion of said hopper-like body, a vertical tie plate rigidly secured to said coupling plate and extending upward and rigidly secured to the front portion of said upper reinforcing rib, said coupling plate being projected forward of said vertical tie plate and constructed and adapted for coupling to the draft bar or bracket of a power truck, said coupling plate being further reinforced by reversely inclined reinforcing brackets rigidly secured thereto and to said tie plate.

3. A wagon box of the kind described comprising side plates and end plates assembled in hopper-like form, a hollow marginal rib reinforcing the upper edge of said box, a hollow intermediate reinforcing rib on the box below the upper reinforcing rib, hollow oblique reinforcing ribs extending from said upper edge rib to the said intermediate rib, and said hopper at its bottom being normally open and provided with a drop gate for closing the same, said box at its bottom portion having a hollow reinforcing rib that extends from the bottom of the box rearward, and a hollow post rigidly connecting the rear portion of said top reinforcing rib to the rear portion of said rearwardly extended bottom ribs.

4. The structure defined in claim 3 in which the rear extended bottom ribs are cross connected to form a U-shaped base frame, the corners of which are connected to said top rib by laterally spaced vertical posts.

5. A wagon box of the kind described comprising side plates and end plates assembled in hopper-like form, a hollow marginal rib reinforcing the upper edge of said box, a hollow intermediate reinforcing rib on the box below the upper reinforcing rib, hollow oblique reinforcing ribs extending from said upper edge rib to the said intermediate rib, and said hopper at its bottom being normally open and provided with a drop gate for closing the same, said box at its bottom portion having a hollow reinforcing rib, in further combination with a coupling plate secured to the front end of the lower portion of said hopper-like body, a vertical tie plate rigidly secured to said coupling plate and extending upwardly therefrom and rigidly secured to the front portion of said upper reinforcing rib, said coupling plate being projected forward from said vertical tie plate and constructed and adapted for coupling to the draft bar or bracket of a power truck.

6. A wagon box of the kind described comprising side plates and end plates assembled in hopper-like form, a marginal rib reinforcing the upper edge of the said box, an intermediate reinforcing rib on said box below said upper edge reinforcing rib, oblique reinforcing ribs extended from said upper edge rib to said intermediate rib, said hopper having in its bottom a discharge opening and a drop gate for closing and opening the same, in further combination with lower reinforcing ribs extended along the sides of the bottom of said hopper, and extending rearward of said hopper, and posts connecting the rear ends of said last noted reinforcing ribs to the rear portion of said upper reinforcing rib.

GEORGE D. ALEXANDER.